United States Patent Office 3,544,609
Patented Dec. 1, 1970

3,544,609
ZINC COMPLEXES
Eric Simon Forbes, Woking, and Howard Bernard Silver, Esher, England, assignors to The British Petroleum Company Limited, London, England, a British company
No Drawing. Filed Nov. 7, 1967, Ser. No. 681,080
Claims priority, application Great Britain, Nov. 10, 1966, 50,369/66
Int. Cl. C07f *3/06;* C10m *5/14*
U.S. Cl. 260—429.9    3 Claims

ABSTRACT OF THE DISCLOSURE

Zinc salt complexes of general formula $$(RCOO)_6Zn_4O(R^1NH_2)_n$$

where R is alkyl, cycloalkyl, aryl, alkaryl, or aralkyl radical and $R^1$ is a straight or branched chain alkyl or alkenyl group having up to 30 carbon atoms and $n$ is an integer from 1 to 8 are new compounds which possess load-carrying and anticorrosion properties in lubricating oils.

---

This invention relates to zinc complexes, in particular to complexes of zinc prepared by reacting amines with the zinc salts described in U.S. Pat. No. 3,367,869 granted on Feb. 6, 1968.

The zinc salts referred to above have the general formula $(RCOO)_6Zn_4O$ wherein R represents an alkyl, cycloalkyl, aryl, aralkyl or alkaryl group preferably having not more than 24 carbon atoms, the compound having a tetrahedral structure with the four zinc atoms at the corners, the oxygen atom in the centre and the six carboxylate groups arranged along the sides. Most suitably R is an alkyl group having up to 18 carbon atoms.

Compounds of this type may be prepared by reacting one molar proportion of zinc oxide with one and a half molar proportions of an acid of the formula RCOOH, wherein R is specified above, and removing all of the water formed during the reaction. The reaction is preferably carried out by refluxing with an azeotroping agent such as benzene or toluene.

The reaction may be represented as follows:

$$6RCOOH + 4ZnO = (RCOO)_6Zn_4O + 3H_2O$$

However the reaction is delivered to proceed in two stages as follows:

$$6RCOOH + 4ZnO \rightarrow 3(RCOO)_2Zn + ZnO + 3H_2O$$

$$3(RCOO)_2Zn + ZnO \rightarrow (RCOO)_6Zn_4O$$

It has now been found that the above-mentioned zinc salts form complexes with amines.

This invention, therefore, provides complexes of the general formula:

$$(RCOO)_6Zn_4O(R^1NH_2)_n$$

wherein R represents an alkyl, cycloalkyl, aryl, aralkyl or alkaryl group, having not more than 24 carbon atoms, $R^1$ represents an alkyl group having from $C_1$ to $C_{30}$ carbon atoms, and which can be saturated or unsaturated, branched or straight-chain, and $n$ is an integer from 1 to 8.

It is believed that the zinc atoms in the complex are arranged tetrahedrally around a central oxygen atom.

The invention also relates to a method of preparing the complexes wherein one mole of the aforesaid tetrahedral zinc salt of the general formula $(RCOO)_6Zn_4O$ is reacted with from one to eight moles of an amine of the general formula $R^1NH_2$, wherein R and $R^1$ have the meanings referred to above.

Examples of suitable amines are n-butylamine and laurylamine.

The reaction is preferably carried out at ambient temperature.

It is preferred to add the basic salt to a solution of the amine in an inert solvent.

The compounds according to the invention are useful as corrosion inhibitors (both in the liquid and vapour phases), load-carrying additives for lubricants and as wash-resistant alkaline additives for marine lubricants.

The preparation of two complexes according to the invention will now be described by way of example.

PREPARATION

Basic zinc 2-ethyl hexanoate (1 mol.) was added to n-butylamine (8 mol.) in an inert solvent at ambient temperature (petroleum ether). The reaction was exothermic. The inert solvent was removed by evacuation and the product recrystallised from n-pentane at low temperatures.

The n-butylamine complex was a white waxy solid.

The laurylamine complex was prepared in a similar manner. It was a white crystalline solid of melting point 61–63° C.

Octylamine basic zinc 2-ethyl hexanoate, laurylamine basic zinc Versatate and laurylamine basic zinc naphthenate were also prepared. They were odourless viscous liquids. The naphthenate complex was yellowish, the 2-ethyl hexanoate and Versatate complexes were colourless. The Versatate radical is obtained from Versatic acid which is a commercially available branched tertiary carboxylic acid as disclosed in U.S. Pat. No. 3,367,869.

PROPERTIES OF COMPLEXES (i) The complex of laurylamine with basic zinc 2-ethylhexanoate was tested using the Institute of Petroleum Rusting Test No. 135B. The results are given in Table 1 below:

| Test solution: | Result |
|---|---|
| 0.5% wt. laurylamine in liquid paraffin | Severe rusting. |
| 0.5% wt. basic zinc 2-ethylhexanoate | Do. |
| Liquid paraffin | Do. |
| 0.5% wt. solution of laurylamine-basic zinc 2-ethylhexanoate in liquid paraffin | Nil rusting. |

This complex showed unexpectedly good rust inhibiting properties in addition to good load-carrying properties as tested by the four ball test (as described in Method 6503 of U.S. Federal Test Method standard No. 791a). The results are given in Table 2 below:

| Blend | Wear scar diameter | | |
|---|---|---|---|
|  | 30 min. | 45 min. | 60 min. |
| 1% wt. laurylamine-basic zinc 2-ethylhexanoate in liquid paraffin | 0.49 | 0.51 | 0.53 |
| Liquid paraffin | 0.65 | 0.755 | 0.795 |

In this test a load of 15 kg. was used and the temperature was 50° C.

(ii) The complex of n-butylamine with basic zinc 2-ethylhexanoate was tested at 0.5% wt. concentration in a medium viscosity index SAE 30 mineral oil in a laboratory water-washing test. The properties of the complex were compared with those of the best available wash-resistant, commercial lubricant containing a basic additive. The results are shown in Table 3 below:

| Blend | Total Base No. | | |
|---|---|---|---|
| | Original blend | After 1st wash | After 2nd wash |
| 100 ml. of commercial lubricant (A) | 0.90 | 0.40 | 0.12 |
| 100 ml. of solution of 0.5% wt. n-butylamine complex in SAE 30 oil (B) | 2.52 | 0.62 | 0.44 |

It can be seen from the table that, after the initial wash, the Total Base No. of a blend containing the n-butylamine complex falls less than the Total Base No. of the commercial lubricant.

The water-washing test was carried out on blends (A) and (B) by subjecting 100 ml. of each blend, plus 1,000 ml. of distilled water, to efficient mixing for 30 minutes at 70° C.

In each case the oil was separated out, half of the oil taken and the mixing cycle repeated, using 500 ml. of distilled water.

The Total Base No. was found after each cycle.

What we claim is:

1. A zinc salt complex of general formula $$(RCOO)_6Zn_4O(R^1NH_2)_n$$

where R represents an alkyl, cycloalkyl, aryl, aralkyl or alkaryl group having not more than 24 carbon atoms, $R^1$ represents a branched or straight chain alkyl or alkenyl group having up to 30 carbon atoms and $n$ is an integer from 1 to 8.

2. A compound as claimed in claim 1 in which $R^1$ is an n-butyl, lauryl or octyl group.

3. A compound as claimed in claim 1 in which the RCOO— radical is a 2-ethyl hexanoate or a naphthenate radical.

References Cited

UNITED STATES PATENTS

| 2,492,939 | 12/1949 | Schertz | 260—429.9 XR |
| 2,819,233 | 1/1958 | Smith et al. | 260—429.9 XR |
| 3,087,950 | 4/1963 | Burnop | 260—429.9 |
| 3,305,330 | 2/1967 | McCoy et al. | 260—429.9 XR |
| 3,351,647 | 11/1967 | Butler et al. | 260—429.9 |
| 3,354,189 | 11/1967 | Revukas | 260—429.9 XR |
| 3,367,869 | 2/1968 | Silver et al. | 260—429.9 XR |
| 3,439,011 | 4/1969 | McCoy et al. | 260—429.9 |

OTHER REFERENCES

Chemical Abstracts, vol. 53, p. 6866c (1959).
Chemical Abstracts, vol. 54, p. 11366i (1960).
Chemical Abstracts, vol. 54, pp. 24086h–24087 (1960).

TOBIAS E. LEVOW, Primary Examiner

H. M. S. SNEED, Assistant Examiner

U.S. Cl. X.R.

252—37.1, 37.5

PO-1050
(5/69)

UNITED STATES PATENT OFFICE
CERTIFICATE OF CORRECTION

Patent No. 3,544,609  Dated December 1, 1970

Inventor(s) Eric Simon Forbes and Howard Bernard Silver

It is certified that error appears in the above-identified patent and that said Letters Patent are hereby corrected as shown below:

Column 1, line 46 change "delivered" to -- believed --

SIGNED AND
SEALED
MAR 2 1971

(SEAL)
Attest:

Edward M. Fletcher, Jr.
Attesting Officer

WILLIAM E. SCHUYLER,
Commissioner of Pat